(12) United States Patent
Zeiner

(10) Patent No.: US 9,664,300 B2
(45) Date of Patent: May 30, 2017

(54) PILOT-OPERATED VALVE WITH FLOATING PISTON

(71) Applicant: Parker-Hannifin Corporation, Cleveland, OH (US)

(72) Inventor: Robert William Zeiner, Torrington, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 14/612,358

(22) Filed: Feb. 3, 2015

(65) Prior Publication Data

US 2015/0219239 A1    Aug. 6, 2015

Related U.S. Application Data

(60) Provisional application No. 61/934,872, filed on Feb. 3, 2014.

(51) Int. Cl.
| | | |
|---|---|---|
| *F16K 31/12* | (2006.01) | |
| *F16K 31/42* | (2006.01) | |
| *F16K 31/40* | (2006.01) | |
| *F16K 15/18* | (2006.01) | |

(52) U.S. Cl.
CPC .......... *F16K 31/426* (2013.01); *F16K 15/186* (2013.01); *F16K 31/408* (2013.01); *Y10T 137/7758* (2015.04)

(58) Field of Classification Search
CPC ..... F16K 31/426; F16K 15/186; F16K 31/408
USPC ................. 251/30.01, 30.02, 30.03
See application file for complete search history.

(56) References Cited

U.S. PATENT DOCUMENTS

| | | | | |
|---|---|---|---|---|
| 3,735,772 A | * | 5/1973 | Hunter ................. | A01G 25/162 137/15.18 |
| 4,540,154 A | * | 9/1985 | Kolchinsky ........... | F16K 31/408 137/315.03 |
| 4,651,926 A | * | 3/1987 | Sasao ..................... | B24B 39/02 239/585.1 |
| 5,113,902 A | | 5/1992 | Doerr | |
| 5,174,544 A | * | 12/1992 | Emanie ................. | F16K 31/408 137/493 |

(Continued)

FOREIGN PATENT DOCUMENTS

EP    0 675 307 A1    10/1995

OTHER PUBLICATIONS

Search Report for corresponding European Patent Application No. 15153670.3 dated Jul. 7, 2015.

*Primary Examiner* — Umashankar Venkatesan
(74) *Attorney, Agent, or Firm* — Renner, Otto, Boisselle & Sklar, LLP

(57) ABSTRACT

A pilot-operated proportional cartridge valve that has low internal leakage and long life, without requiring close ID/OD spool clearances that add cost to comparable prior art valves. The flow control valve is uniquely characterized by the use of two axially spaced-apart spring energized wiper seals that floatingly support a flow control piston within a cylindrical chamber to allow transaxial shifting movement of the piston for proper alignment with mating components, such as a valve seat. The spring energized wiper seals are preferably oriented in opposite directions for sealing against pressure differentials at opposite ends of the valve piston. In a preferred embodiment, the seals are spring energized cup seals.

11 Claims, 9 Drawing Sheets

(56) References Cited

U.S. PATENT DOCUMENTS 5,370,354 A * 12/1994 Kunz ................. F16K 31/0658
                                                      251/129.15
5,676,342 A * 10/1997 Otto ..................... F16K 31/404
                                                      251/30.02
6,622,696 B2 * 9/2003 Witzel ..................... F02D 9/16
                                                      123/337

* cited by examiner

PILOT-OPERATED VALVE WITH FLOATING PISTON

RELATED APPLICATIONS

This application claims the benefit of U.S. Provisional Application No. 61/934,872 filed Feb. 3, 2014, which is hereby incorporated herein by reference.

FIELD OF INVENTION

The present invention relates generally to flow control devices, and more particularly to pilot-operated valves.

BACKGROUND

Conventional spool valves spool generally require close ID/OD clearances. Even with close tolerances, spool valves have a tendency to leak low viscosity liquids and gases.

SUMMARY OF INVENTION

The present invention provides a flow control valve and more particularly a pilot-operated proportional cartridge valve that has low internal leakage and long life, without requiring close ID/OD spool clearances that add cost to comparable prior art valves. According to one aspect of the invention, a flow control valve is uniquely characterized by the use of two axially spaced-apart spring energized wiper seals that floatingly support a flow control piston within a cylindrical chamber to allow transaxial shifting movement of the piston for proper alignment with mating components, such as a valve seat. The spring energized wiper seals are preferably oriented in opposite directions for sealing against pressure differentials at opposite ends of the valve piston. In a preferred embodiment, the seals are spring energized cup seals.

In a preferred embodiment, the valve is a cartridge valve with high pressure proportional and on/off capability. Included are designs for both normally closed and normally open functionality. The valve family utilizes a pilot operated piston to proportionally or digitally modulate the flow from full off to full on. The piston modulates or moves by virtue of balancing the pressure on both (top and bottom) sides of the piston. The pressure is balanced by modulating the bleed flow on the top side of the piston. The bleed flow is modulated by the positional relationship between a pintle and pintle valve seat. The seat is part of the piston. The pintle is part of a proportional valve operator configured in either "push" or "pull" configurations. The "push" operator is used for normally open valves and the "pull" operator for normally closed valves.

In both normally closed and normally open valves, the piston exactly tracks the movement of the magnetic operator movement. The sealing of the piston to the valve body controls bleed and bypass media. The piston seals also function as resilient bearings as above described. The seals are spring-energized and arranged in an opposing fashion so they seal pressure differences on both the top and bottom sides of the piston.

The valves may be powered by a 12 or 24 VDC, 200 Hz Pulse Width Modulated (PWM) square wave. The valve flow increases with increasing duty cycle on a normally closed version and the normally open valve decreases flow by increasing duty cycle. At 0% duty cycle the normally closed valve is off, the normally open valve is full open at 0% duty cycle.

This valve can be used for waste heat recovery applications. The valve can control the flow of liquid refrigerant in a Rankin Cycle closed loop system.

Accordingly, a fluid flow control valve according to one aspect of the invention includes a valve body having an inlet port, an outlet port in selective fluid communication with the inlet port by a main passageway through the valve body, and a valve seat surrounding the main passageway. A valve member is mounted in the valve body for axial movement between closed and open positions respectively blocking and permitting flow through the valve seat. The valve member has a piston portion that separates a control chamber upstream of the valve seat from a point downstream of the valve seat and a pilot orifice through the piston portion for bleeding off pressure from the control chamber to the point downstream of the valve seat. The valve further includes a plunger movable between a first position blocking flow through the pilot orifice and a second position allowing flow through the pilot orifice, and axially spaced apart spring energized wiper seals that radially support the piston within the passageway while allowing limited radial movement within the passageway.

Preferably the spring energized wiper seals are spring-energized cup seals.

Preferably the spring-energized seals are oppositely oriented for sealing against pressure differentials between the control chamber and a point downstream of the valve seat.

The valve may also include a bleed orifice in communication with the inlet and the control chamber for allowing pressure from the inlet to build up in the control chamber for urging the valve member toward the first position when the plunger is in the first position.

The pilot orifice preferably has a cross-sectional area that is greater than a cross-sectional area of the bleed orifice.

Preferably the wiper seals wipe along an inner diameter surface of the valve body that has been roller burnished.

In preferred embodiments, the piston is made of a plastic material and in particular a polyetherimide, and the bleed and pilot orifices are machined into steel inserts secured in the plastic material of the piston.

Preferably a filter is provided in the piston for filtering fluid prior to passage through the bleed orifice, the filter preferably being a multilayered depth screen.

A resilient member can bias the plunger toward the first position, such that the valve functions as a normally closed valve.

A resilient member can bias the valve member toward the open position, such that the valve functions as a normally open valve.

In preferred embodiments, a solenoid coil is provided for moving the plunger.

The position of the plunger over a stroke thereof may be proportional to the current supplied to the solenoid coil, and preferably the current is pulse-width modulated.

According to another aspect of the invention, a valve comprises a valve body having an inlet and an outlet and a valve seat; a piston movable relative to the valve body to open and close the valve, the piston having a sealing surface for engaging the valve seat when the piston is in the closed position, a bleed orifice providing fluid communication between the sealing surface and a chamber opposite the sealing surface, and a pilot orifice providing fluid communication between the chamber and the outlet; a plunger assembly having a pintle that is movable to open/close the pilot orifice, wherein when the valve is pressurized the opening and closing of the pilot orifice by the pintle results in a change in pressure of the chamber relative to pressure at the sealing surface thereby effecting movement of the piston to proportionally open or close the valve; and a coil for effecting movement of the plunger assembly.

A pair of spaced apart seal bearings preferably surround the piston and seal between an outer surface of the piston and an inner annular surface of the valve body.

The foregoing and other features of the invention are hereinafter described in greater detail with reference to the accompanying drawings.

DETAILED DESCRIPTION

Figure 1:
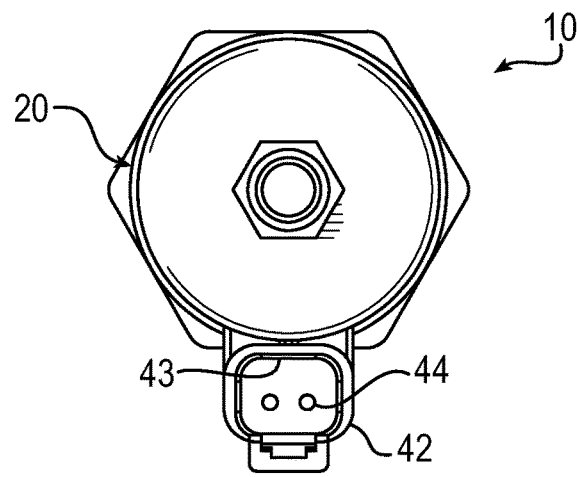
FIG. 1 is a top view of an exemplary normally closed pilot-operated valve according to the invention.
Figure 2:
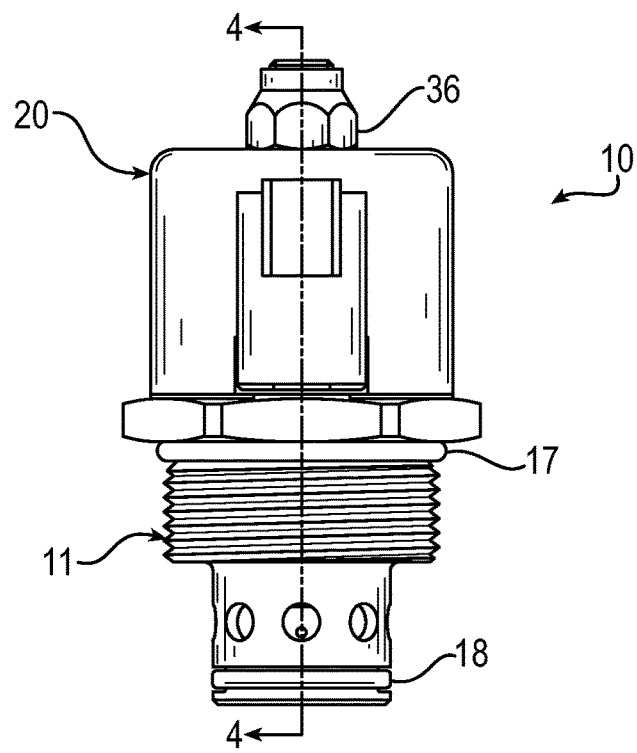
FIG. 2 is an elevational view of the pilot-operated valve.
Figure 3:
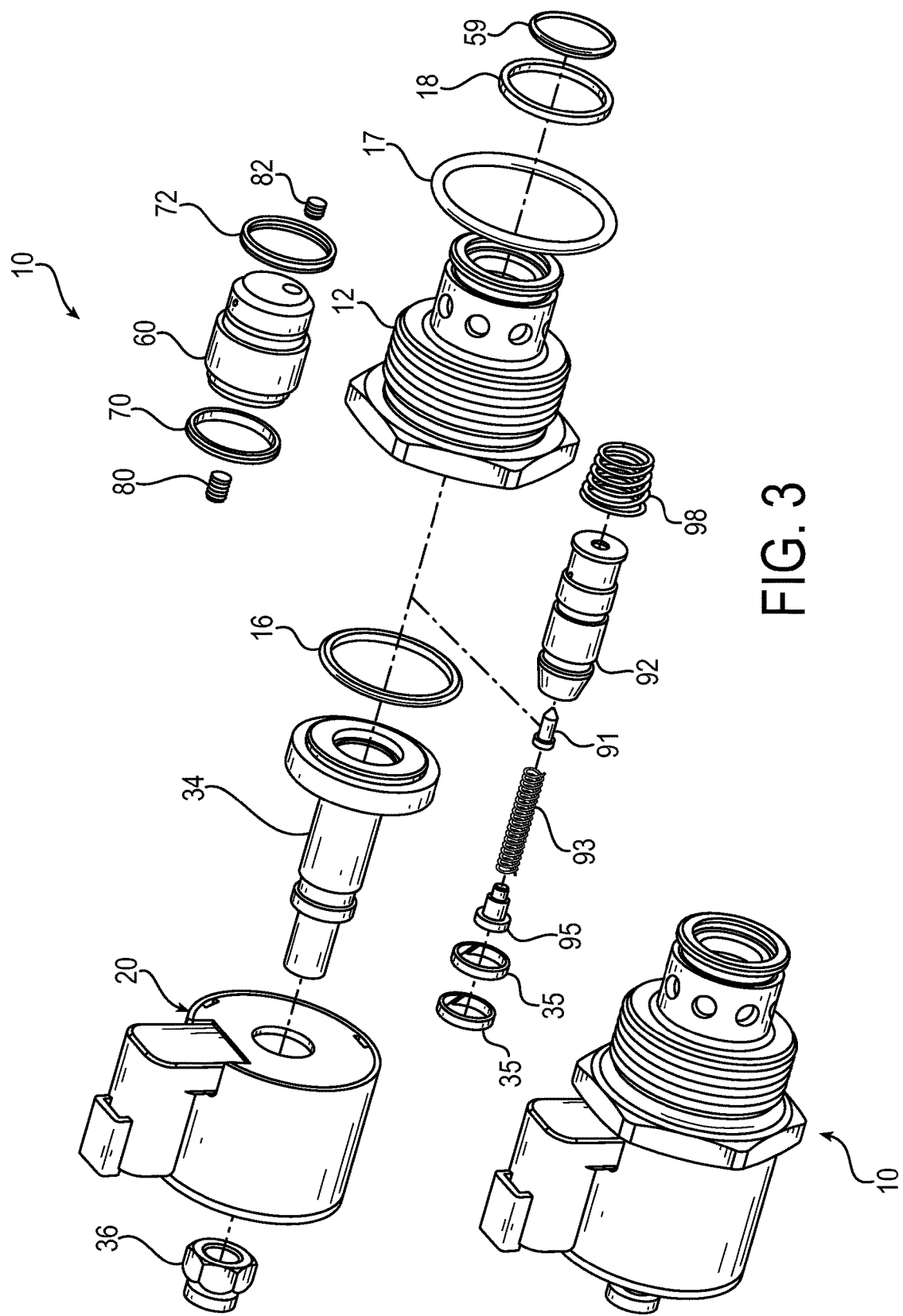
FIG. 3 is an exploded view of the pilot-operated valve.

The principles of this present invention have particular application to pilot-operated valves and particularly those used in waste heat recovery applications, such as for controlling the flow of liquid refrigerant in a Rankin-cycle closed loop system. It will of course be appreciated, and also understood, that principles of this invention may be applicable to other types of valves used for various applications.

Referring to the drawings, and initially to FIGS. 1-5, an exemplary pilot-operated valve is illustrated generally at reference numeral 10. The valve includes a housing 11 having a valve body 12 and cover 14. The cover 14 may be sealed to the main body 12 by a suitable seal 16, such as an O-ring. In the art, the cover also is commonly referred to as a closure or a flange.

As shown, the cover may be externally threaded for threaded receipt in a threaded bore in the top of the valve body 12.

Similarly, the valve body 12 may be externally threaded for threading into a bore in a manifold (not shown) and may have seals 17 and 18, such as an O-rings, for sealing the valve body to the manifold. Consequently, the valve 10 can be considered a cartridge-type valve.

A solenoid assembly 20 is assembled on the valve body 11.

In the illustrated embodiment, the solenoid assembly 20 is composed of three parts, a plunger assembly 22, a coil assembly 23, and a sleeve assembly (also more simply referred to herein as a sleeve). The plunger assembly includes a plunger 32 that is movable axially in the sleeve 34 that is secured and sealed to the cover 14. As shown, the plunger may be radially supported in the sleeve by a pair of bushings 35.

The axially inner end of the sleeve 34 may be assembled in a bore in the cover 14 and fixed and sealed therein as by welding or other suitable means. The axially outer end of the sleeve may be externally threaded for attachment of a nut 36 used to fasten the coil assembly 23 to the plunger assembly.

As shown, the coil assembly 23 includes a solenoid coil 38 that is contained within a coil casing 39. The solenoid coil surrounds a bobbin 40 that defines an interior tube-like space that allows the coil assembly to be slipped axially over the sleeve 34, with the threaded end of the sleeve 34 protruding beyond the coil casing.

The coil assembly 23 further includes a body 42 in which the coil assembly and bobbin are housed. As is typical, the body may be injection molded over the coil winding and bobbin. The body 42 is for the most part enclosed by the coil casing 39, although a portion protrudes from the case to provide for electrical connection of the coil to an external power source. As shown, the solenoid body may have formed therein a socket 43 into which electrical terminals 44 extend for mating with the terminals of an external connector that may plug into the socket.

The coil 38 may be powered by suitable means, such as by a 12 or 24 VDC, 200 Hz pulse width modulated (PWM) square wave generated by a suitable power source. As will be appreciated, flow through the valve 10 will proportionally increase with increasing duty cycle on a normally closed version and proportionally decrease with increasing duty cycle on a normally open valve. At 0% duty cycle a normally closed valve is off, and a normally open valve is full open at 0% duty cycle.

The sleeve 34 may be formed by a central tube 45 to which an axially outer end piece 46 is fixed and sealed by suitable means, such as by laser welding. The axially inner end of the central tube 45 may be fixed in a bore in the cover 14, as by laser welding or other suitable means. In the illustrated embodiment, the end piece 46 and cover are formed from magnetic stainless steel, for example, and the central tube 45 is a non-magnetic series stainless steel, for example. The end piece and cover co-act with the coil when energized to create a magnetic circuit for producing an attraction between the outer end piece and the plunger 32. The outer end piece also functions as a stop for the plunger.

Figure 4:
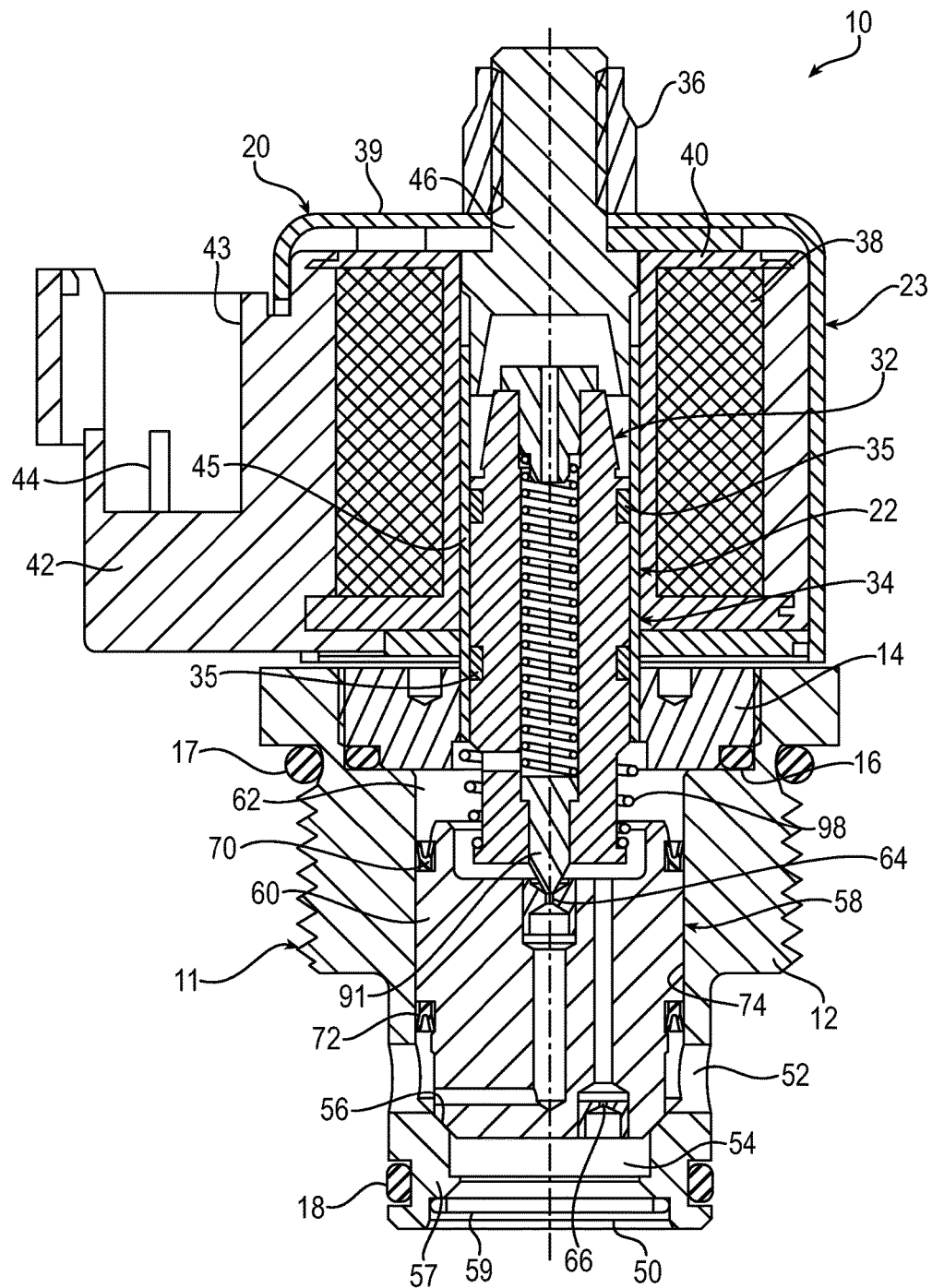
FIG. 4 is a cross-sectional view of the pilot-operated valve, taken along the line 4-4 of FIG. 2, showing the valve in a closed state.
Figure 5:
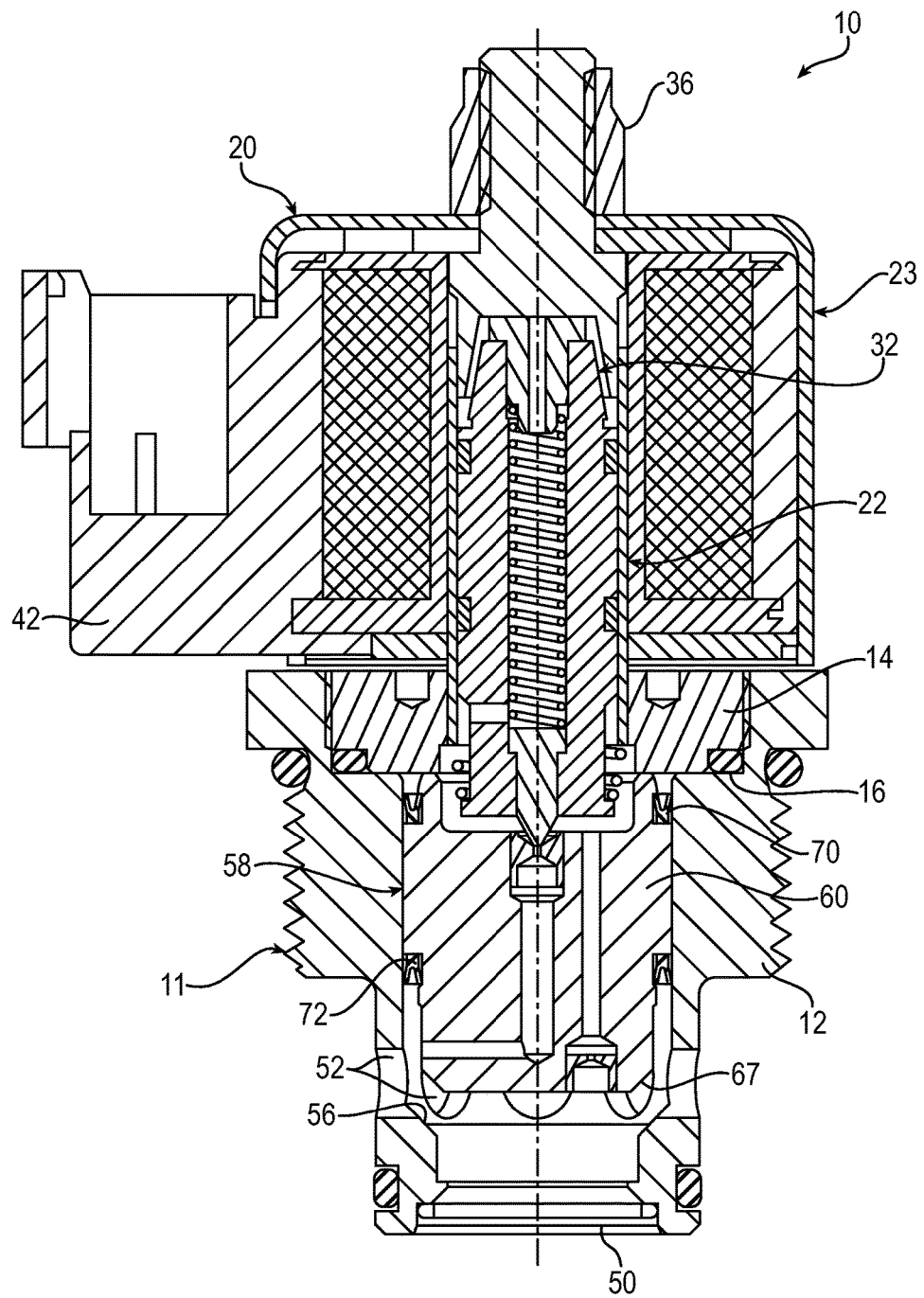
FIG. 5 is a cross-sectional view similar to FIG. 4, but showing the valve in an open state.

As best seen in FIGS. 4 and 5, the valve body 12 has an inlet port 50, an outlet port 52 in selective fluid communication with the inlet port 50 by a main passageway 54 through the valve, and a valve seat 56 surrounding the main passageway 54. The valve body 12 includes a wall 57, an upper portion of which forms the valve seat 56, which directs the flow from the inlet port 50 through the main passageway 54 upward towards the valve seat 56. Fluid, such as a refrigerant, will flow through the valve seat 56 along the main passageway 54 to the outlet port 52 when a valve member 58 is moved away from the valve seat 56. Although described as being part of the valve body 12, it will be appreciated that the valve seat 56 may be a separate piece within the valve body 12. As shown, the outlet port may be formed by a plurality of radial passages in the valve body. In addition, the inlet port may be equipped with an optional screen 59.

A valve member 58 is mounted in the valve housing 11 between the valve body 12 and cover 14 for movement between a closed position blocking flow through the valve seat 56 (FIG. 4) and an open position permitting flow through the valve seat 56 (FIG. 5). The valve member 58 has a piston portion 60 (or more simply a piston) that separates a control chamber 62 from a point downstream of the valve seat 56, a pilot orifice 64 through the piston 60, a bleed orifice 66 in communication with the inlet 50 and the control chamber 62, and a sealing surface 67 (FIG. 7) that engages the valve seat to close the passage through the valve seat. When the pilot orifice is closed by the plunger 32 (as described in detail below), the bleed orifice 66 allows pressure from the inlet 50 to build up in the control chamber 62 for urging the valve member 58 in the closed position when the coil assembly 23 is de-energized. Although shown as extending through the piston 60, it will be appreciated that the bleed orifice 66 may be formed in the valve body 12 and/or cover 14.

The pilot orifice 64, which is provided for bleeding off pressure from the control chamber 62 to a point downstream of the valve seat 56, typically will have a cross-sectional area that is greater than a cross-sectional area of the bleed orifice 66.

As seen in FIGS. 4 and 5, the piston 60 is sealed to the valve body 12 and radially supported for axial movement in the valve body by a pair of axially spaced apart spring-energized wiper seals 70 and 72 (e.g. lip seals). The wiper seals not only seal and support the piston in relation to the valve body, they also allow limited radial movement within an interior bore 74 in the valve body because the outer diameter of the piston is intentionally designed to be smaller than the diameter of the bore 74 in the valve body, such as by about 0.015 inch. As a result, the piston is supported in a "floating" fashion such that it can shift radially a limited amount to accommodate misalignment between the sealing surface 67 and the valve seat 56 so that the sealing surface will properly engage and seal against the sealing surface. Not only does this provide for better sealing, it also reduces wear on the sealing surface, particularly when the valve member 58 is formed from a plastic material as is preferred. In addition, the valve member can shift radially to accommodate any misalignment between the pilot orifice 64 and the plunger 32 (more particularly the below discussed pintle).

Preferably the wiper seals 70 and 72 are oppositely oriented as shown to provide sealing in both directions to seal against differential pressures in the control chamber and the point downstream of the valve seat. A preferred wiper seal is a spring energized cup seal, and more preferably one made of PTFE. Particularly preferred seals are Flexiseals available from Parker-Hannifin Corporation of Cleveland, Ohio, USA.

As will be appreciated, a spring-energized seal includes at least one sealing lip that is resiliently urged radially to bias the lip against the surface in contact therewith.

This manner of supporting and sealing the piston to the valve body enables one or more following advantages to be achieved:

provides sealing against possible differential pressures in both directions.
design and material selection provides a low wear bearing surface which self-compensates for wear in non-lubricated applications.
scraper feature provides a high degree of debris tolerance.
The Flexiseal geometry (or more generally the spring-energized lip seal geometry) allows for the piston to float within its radial clearance to ensure that the seat surfaces mate properly when valve is in closed position.
the spring energized dual lip seals (e.g. cup seals) combined with a roller burnished valve body bore (6-8 micro-finish) provides low wear frictional damping. This helps mitigate unwanted oscillations (water hammer) in compressible gas applications.

As just noted, the interior cylindrical surface 74 of the valve body preferably is roller burnished to provide a 6-8 micro-finish, i.e. a surface or micro roughness in the range of 6 to 8 micro inches.

As above noted, the valve member 56 (in particular the piston 60) preferably is made of a plastic material such as a polyetherimide (PEI) and particularly Ultem PEI. This makes the valve particularly suitable for high vibration applications such as those "on-engine" (i.e. where the valve is mounted to an engine). In contrast to other designs where bleed and pilot orifices are machined into the plastic, preferably the valve member is a composite assembly.

Figure 7:
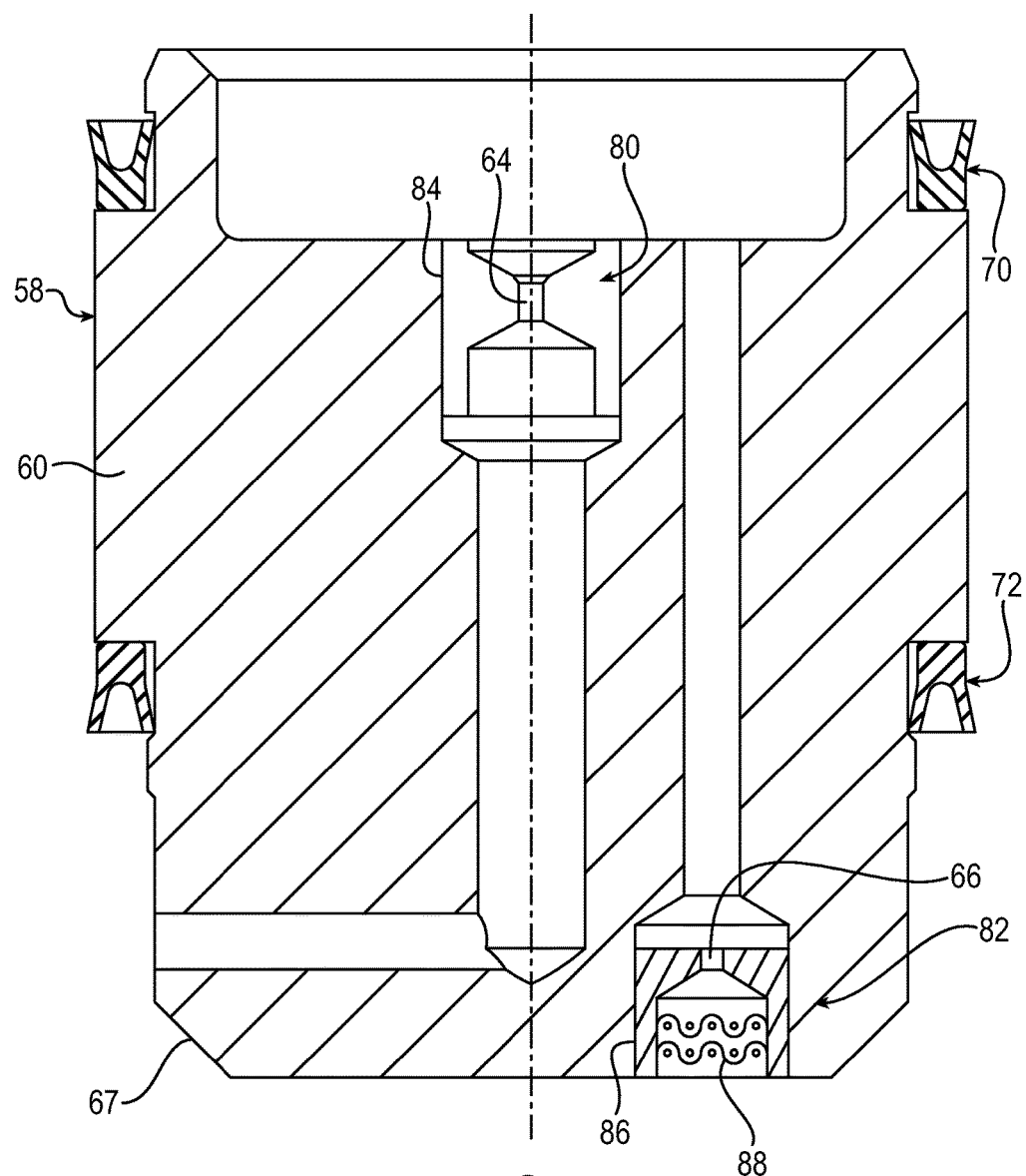
FIG. 7 is a further enlarged view of a valve piston used in the pilot-operated valve.

As illustrated in FIG. 7, the bleed and pilot orifices 64 and 66 preferably are, respectively, precision machined in metal inserts 80 and 82 preferably made austenitic stainless steel. This choice of material provides long term resistance to erosion which could impact valve performance (diameters change).

In the case of the pilot orifice, it provides a hard mating seating surface which won't deform over actuation cycles. The metallic pilot and bleed inserts 80 and 82 preferably have radially outwardly protruding interference ribs 84 and 86 that provide a positive seal and mechanical hold within the polymer piston.

In applications where there may be debris present, the bleed orifice insert 82 may include a filter 88 such as a multilayered depth screen to protect the small bleed orifice which may be a small as 0.012". Screened precision orifices can be purchased from the Lee Company of Westbrook, Conn., USA.

Figure 6:
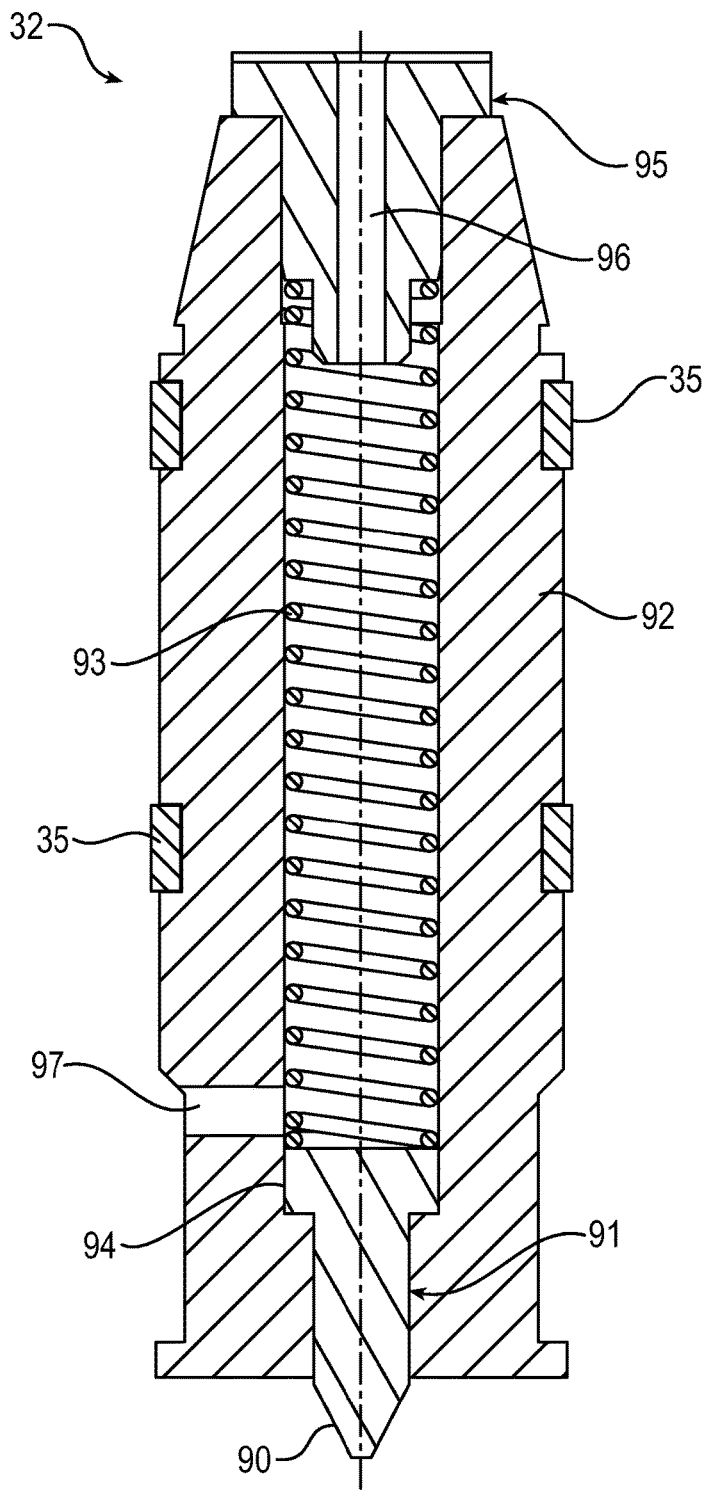
FIG. 6 is an enlarged cross-sectional view of a solenoid actuated plunger used in the pilot-operated valve.

In FIG. 6, a preferred plunger 32 is shown in greater detail. The plunger has a pilot orifice sealing surface 90 at is inner end (lower end in FIG. 6). Preferably, this sealing surface is formed by the tapered end of a pintle 91. The pintle is axially movable in a bore in a plunger body 92, and is inwardly (downwardly in FIG. 6) by a resilient member 93 such as the spring. The pintle has a flange 94 that will engage against a shoulder on the inner diameter of the plunger bore to determine the extent the pintle protrudes beyond the end of the plunger body. The spring is interposed between the pintle and a plug 95 that closes to the outer end of the plunger bore. The plug, spring and pintle preferably are made of non-magnetic stainless steel while the plunger body preferably is made of magnetic stainless steel.

With additional reference to FIGS. 4 and 5, the plug and tubular wall of the plunger body respectively have vent passages 96 and 97 to allow fluid to flow to and from the chamber formed in the sleeve between the end of the plunger and the outer end piece so axial movement of the plunger will not be impeded.

The plunger 32 is biased by a resilient member 98, such as a coil spring, to a first position bringing the sealing surface of the pintle into sealing engagement with the pilot orifice 64, thereby blocking flow through the pilot orifice 64 when the coil assembly 23 is de-energized. The resiliently biased plunger will also act on the valve member 58, urging it into engagement with the valve seat 56. When pressure is applied at the inlet, pressure will bleed through the valve member until the pressure in the control chamber 62 equals the pressure at the inlet. The piston 60 has a larger diameter than the valve seat 56 and the pressure at the point downstream of the valve seat 56 is lower than the inlet pressure, and thus the pressure of the fluid in the control chamber 62 acts on the piston portion 60 to hold the valve member 58 in the first position blocking flow through the valve seat 56.

When the coil assembly 23 is energized, the plunger 32 will be drawn away from the pilot orifice 64 to a second position, such position being determined by the duty cycle of the coil. This will allow flow through the pilot orifice 64 to a location downstream of the valve seat. This will reduce the pressure in the control chamber and will result in the inlet pressure forcing the valve member away from the valve seat to allow flow through the valve. The valve member will open until once again the pilot orifice is closed by the plunger, at which point further opening of the valve will cease. The open position of the valve will be determined by the position of the plunger which is determined by the power being supplied to the coil. The higher the power, the more the valve will be open.

Summarizing, the valve is shown in its normally closed position in FIG. 4. With the coil de-energized, the plunger return spring forces the piston downwards in the closed position. When the valve is pressurized, system pressure enters the bleed orifice and pressurizes the volume above the piston. Because the plunger assembly pintle is sealed against the pilot orifice, the pressure on the top and bottom sides of the piston assembly are balanced. Since the piston area is larger than the main orifice area, the net force downward is greater. This creates a positive seal between the piston and the valve body. When the coil is energized the plunger assembly moves proportionally upwards depending on the PWM duty cycle which is provided.

When the plunger assembly pintle lifts off the pilot orifice, the flow is greater than that of the bleed orifice, therefore the pressure on top of the piston assembly decreases causing it to move upward. The piston assembly will move upwards until it approaches the plunger assembly pintle as seen in FIG. 5.

Though the plunger assembly and piston assembly are independent, their movement is tightly coupled by virtue of the pressure differential and resulting movement created on both sides of the piston assembly.

Figure 8:
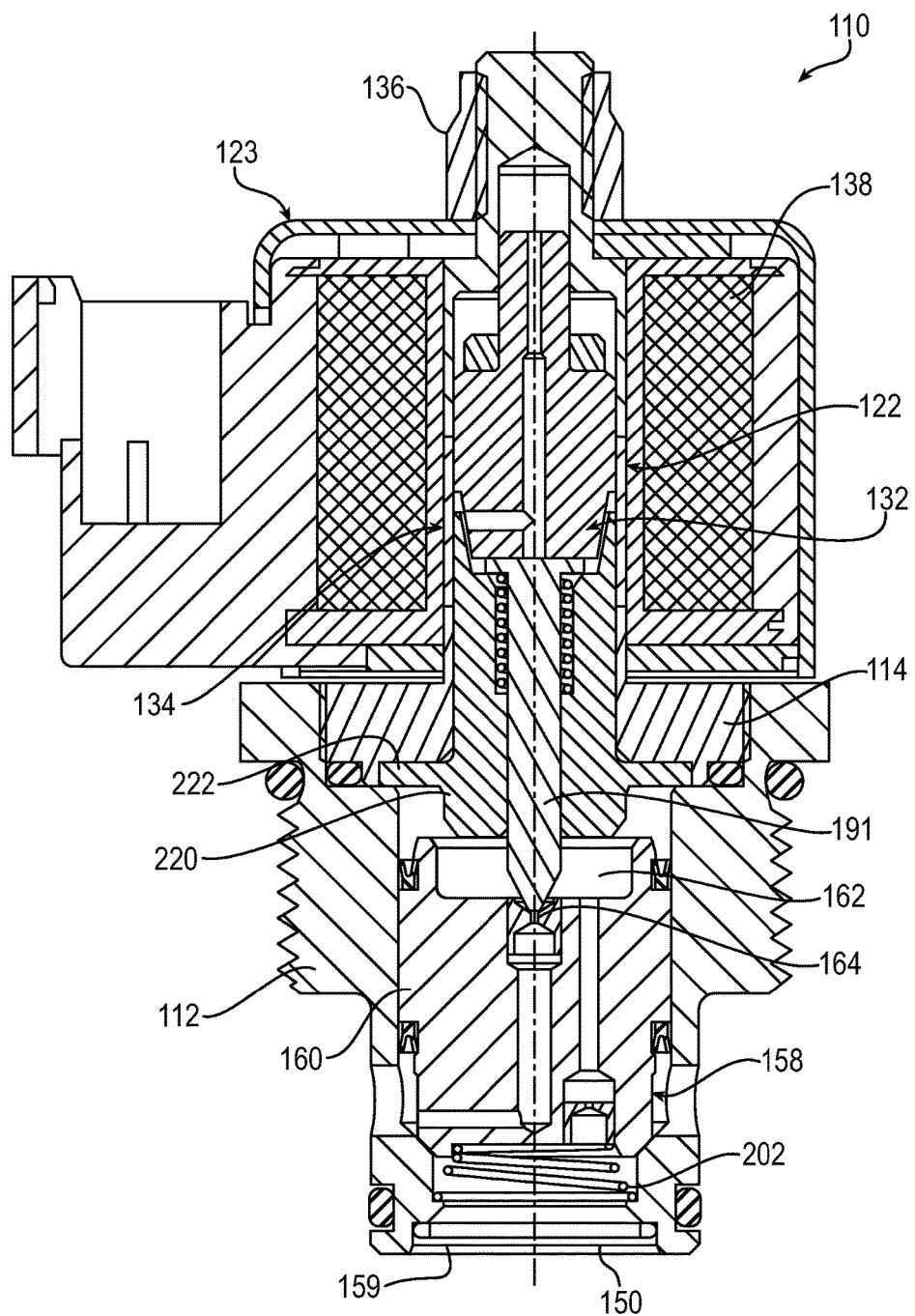
FIG. 8 is a cross-sectional view of an exemplary normally open pilot-operated valve, showing the valve in a closed state.
Figure 9:
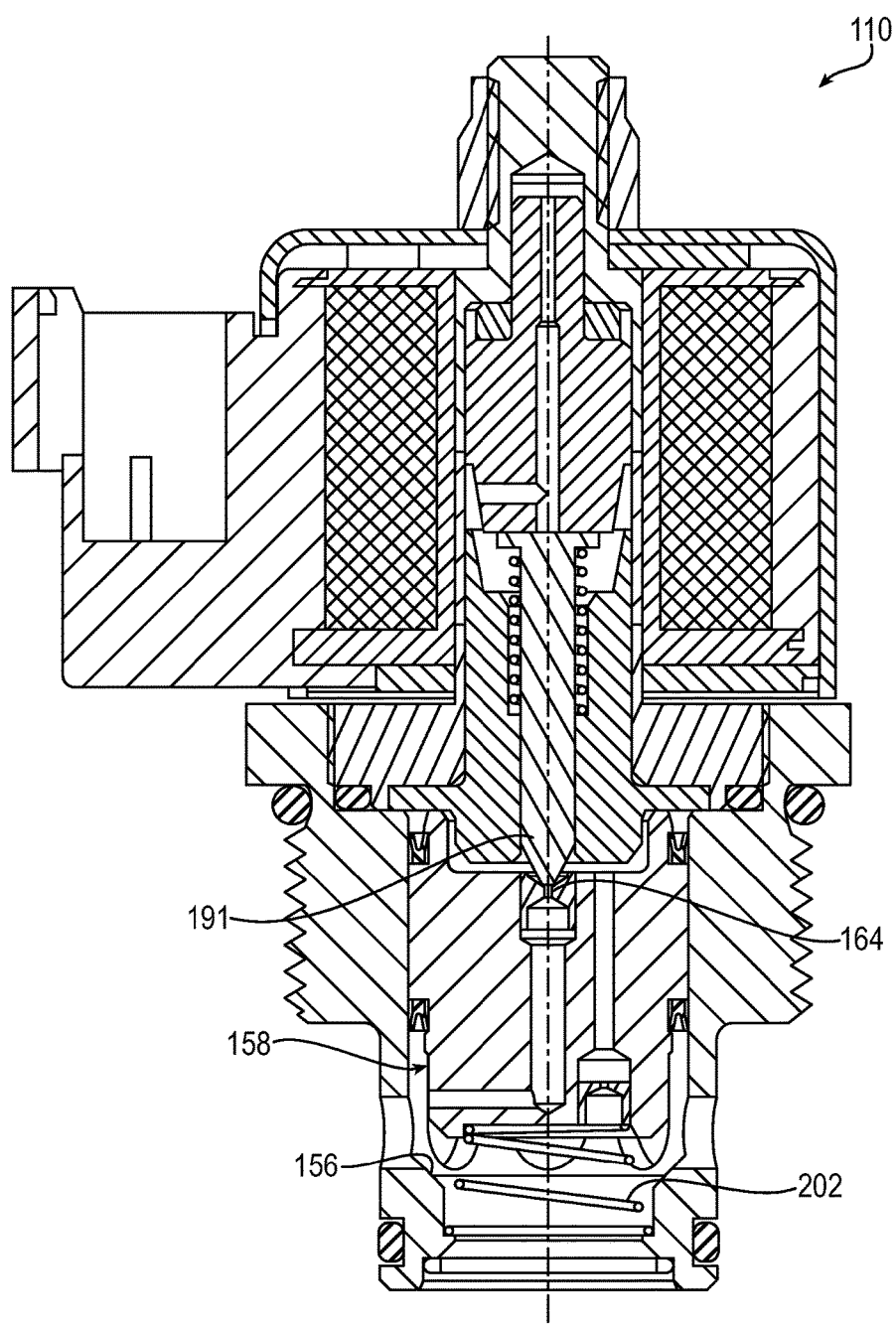
FIG. 9 is a cross-sectional view of the pilot-operated valve of FIG. 8, showing the valve in an open state.

Turning now to FIGS. 8 and 9, a normally open version of an exemplary valve according to the invention is indicated at 110. The valve 110 is the same as the valve 10 except as set forth below. Accordingly, like features are denoted by the same reference number but indexed by 100.

As seen in FIGS. 8 and 9, a resilient member 202 is used to bias the valve member 158 away from the valve seat. In the illustrated embodiment, the resilient member is a tapered coil spring that is interposed between a retaining ring or a screen 159 secured in the valve body 112 and the underside of the valve member.

While the plunger assembly 22 in the valve 10 is a pull plunger assembly, the plunger assembly 122 in the valve 110 is a push plunger assembly.

Figure 10:
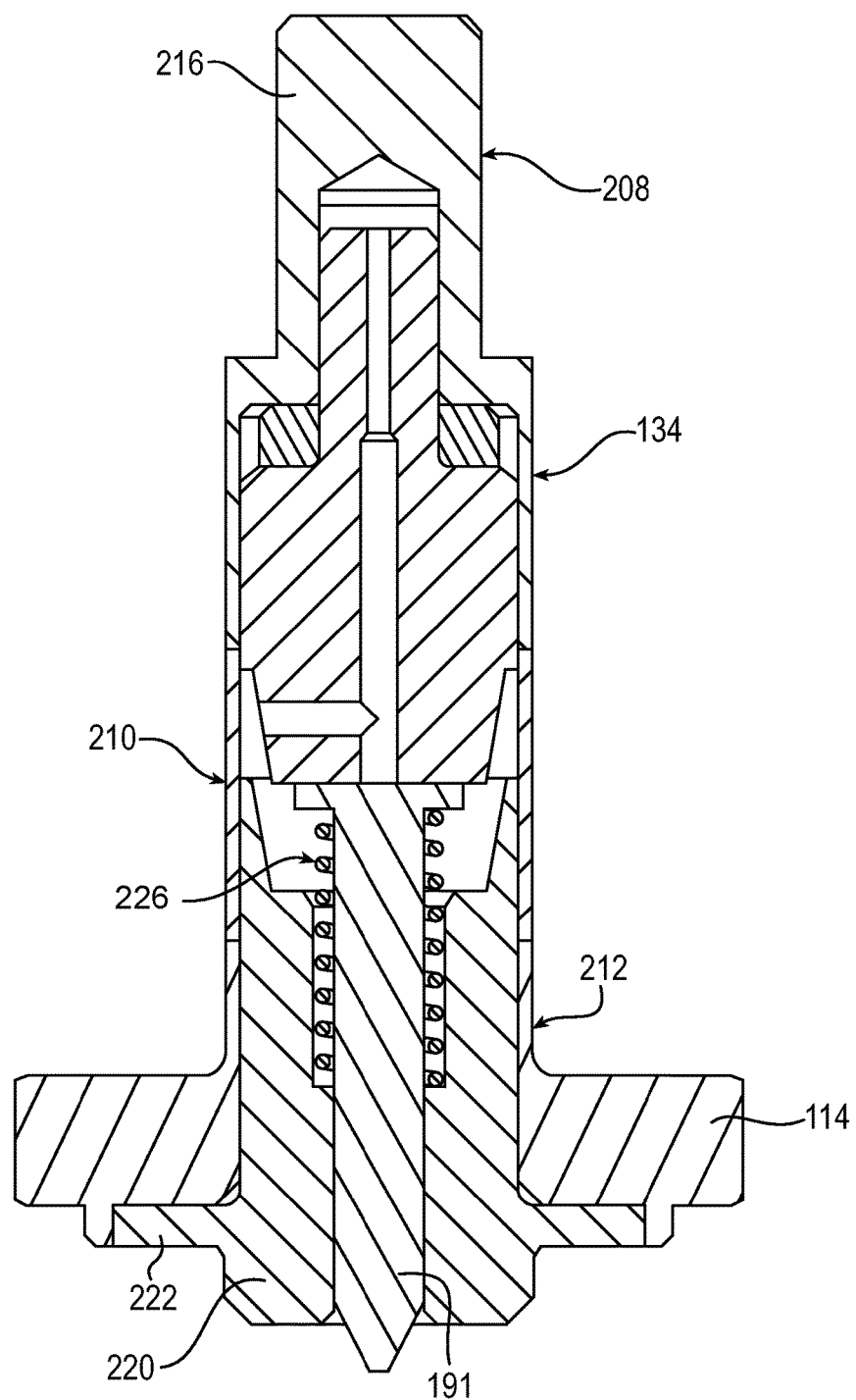
FIG. 10 is an enlarged cross-sectional view of a plunger used in the pilot-operated valve of FIG. 8.

The plunger assembly 122 includes a plunger 132 that is movable axially in a sleeve 134 that is secured and sealed to the cover 114. In the illustrated embodiment and as best seen in FIG. 10, the sleeve has an axially outer portion 208 made of magnetic stainless steel, an intermediate portion 210 made of non-magnetic steel, and an axially inner portion 212 made of magnetic stainless steel. The inner portion may be unitary with the cover 114 that also is made of magnetic stainless steel.

The outer portion 208 of the sleeve may be closed by an end wall that has a protruding post portion 216. The post portion may be externally threaded for attachment of a nut 136 used to fasten the coil assembly 123 to the plunger assembly 122. The end wall may have a bore for receiving and guiding a reduced diameter outer end portion of the plunger.

The plunger 132 acts on a pintle 191 which is guided for axial movement in an end piece 220 made of magnetic steel. The end piece functions as a stop for the pintle which has a radially outwardly extending flange at its outer end that will engage a shoulder on the end piece to limit the extension of the pintle from the end piece. The end piece can be held stationary in the sleeve, as by means of a radially outwardly extending flange 222 that is trapped between the cover and the valve body 112 as shown in FIGS. 8 and 9. The pintle is axially biased outwardly away from valve member 158 by a resilient member 226, such as a coil spring that is interposed between the pintle flange and the bottom of a counterbore in the end piece 220.

Consequently, when no power is being supplied to the coil 138, the pintle will be retracted into the end piece. The valve member will be held away from the valve seat by the spring 202 to maintain the valve in an open state as seen in FIG. 9. When fluid pressure is supplied at the inlet 150, fluid will flow through the open valve. Fluid pressure at the inlet will be bled to the control chamber 162 and this will cause the valve member to start closing when the pilot orifice 164 is closed by the pintle as shown in FIG. 9. As the valve member moves toward its closed position the pilot orifice will move away from the pintle, causing pressure to be released from the control chamber, thereby maintaining the valve member in a full open state.

To close the valve, the coil is energized to establish a magnetic field that will draw the plunger 132 to the end piece 220. The plunger will then force the pintle axially inwardly towards the valve member (that is pushed out of the sleeve) such that it will follow the piston 160 as the piston is caused to move toward the valve seat 156 by fluid pressure bled into the control chamber. The extent of this following movement will be dictated by the energy supplied to the coil, and this will in turn dictate the extent of closing movement of the valve member.

Summarizing, the valve is shown in its normally open position in FIG. 8. With the coil de-energized, the plunger return spring forces the plunger upwards.

The piston assembly return spring forces the piston to the open position.

When the valve is pressurized, system pressure enters the bleed orifice and pressurizes the volume above the piston. Because the plunger assembly pintle is not sealed against the pilot orifice, the pressure on the top side of the piston assembly is lower, therefore the piston will stay open.

When the coil is energized, the plunger assembly moves proportionally downwards depending on the PWM duty cycle which is provided.

When the plunger assembly pintle approaches or touches the pilot orifice, the flow is lesser than that of the bleed orifice, therefore the pressure on top of the piston assembly increases causing it to move downward. The piston assembly will move downwards until it closes against the valve body main orifice.

Though the plunger and piston assembly are independent, there movement is tightly coupled by virtue of the pressure differential and resulting movement created on both sides of the piston assembly.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fluid flow control valve including:
   a valve body having an inlet port, an outlet port in selective fluid communication with the inlet port by a main passageway through the valve body, and a valve seat surrounding the main passageway;
   a valve member mounted in the valve body for axial movement between closed and open positions respectively blocking and permitting flow through the valve seat, the valve member having a piston portion that separates a control chamber upstream of the valve seat from a point downstream of the valve seat and a pilot orifice through the piston portion for bleeding off pressure from the control chamber to the point downstream of the valve seat;
   a plunger movable between a first position blocking flow through the pilot orifice and a second position allowing flow through the pilot orifice;
   axially spaced apart spring energized wiper seals that radially support the piston within the passageway while allowing limited radial movement within the passageway; and
   a bleed orifice in communication with the inlet port and the control chamber for allowing pressure from the inlet port to build up in the control chamber for urging the valve member toward the first position when the plunger is in the first position,
   wherein the piston is made of a plastic material, and
   wherein the bleed and pilot orifices are machined into a steel inserts secured in the plastic material of the piston, and the inserts have on a radially outer surface thereof annular interference ribs that engage in an inner diameter surface of a respective bore in the piston to effect a positive seal and hold within the plastic material of the piston.

2. The valve according to claim 1, wherein the spring energized wiper seals are spring-energized cup seals.

3. The valve according to claim 1, wherein the spring-energized seals are oppositely oriented for sealing against pressure differentials between the control chamber and a point downstream of the valve seat.

4. The valve according to claim 1, wherein the pilot orifice has a cross-sectional area that is greater than a cross-sectional area of the bleed orifice.

5. The valve according to claim 1, wherein the wiper seals wipe along an inner diameter surface of the valve body that has been roller burnished.

6. The valve according to claim 1, wherein the piston is made of a polyetherimide.

7. The valve according to claim 1, further including a filter in the piston for filtering fluid prior to passage through the bleed orifice, the filter being a multilayered depth screen.

8. The valve according to claim 1, further including a resilient member that biases the plunger toward the first position, such that the valve functions as a normally closed valve.

9. The valve according to claim 1, further including a resilient member that biases the valve member toward the open position, such that the valve functions as a normally open valve.

10. The valve according to claim 1, further including a solenoid coil for moving the plunger.

11. The valve according to claim 10, wherein the position of the plunger over a stroke thereof is proportional to the current supplied to the solenoid coil, and the current is pulse-width modulated.

* * * * *